March 4, 1958  F. TSCHAPPU  2,825,673
THERMAL INSULATING COVERING FOR A PIPE
Filed April 27, 1955
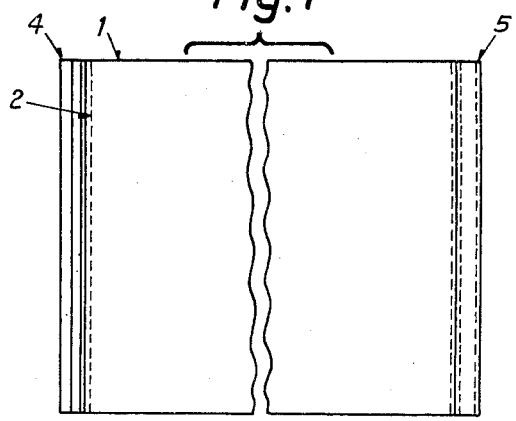
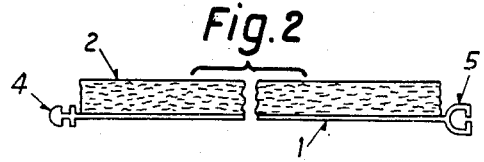
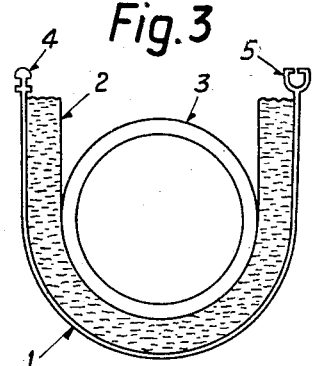
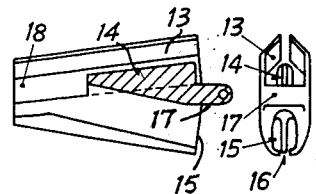
FRANZ TSCHAPPU, INVENTOR.
BY Richards & Geier
ATTORNEYS

United States Patent Office 2,825,673
Patented Mar. 4, 1958

2,825,673

THERMAL INSULATING COVERING FOR A PIPE

Franz Tschappu, Glattbrugg, Zurich, Switzerland, assignor of two-fifths to Josef Troxler, Zurich, Switzerland Application April 27, 1955, Serial No. 504,313

Claims priority, application Switzerland April 27, 1954

1 Claim. (Cl. 154—44)

The present invention relates to a method of covering pipes with a heat insulation, as well as to an insulation for applying the said method.

There are a great number of materials for the heat insulation of pipe-lines, for instance plaited insulations made of textiles such as wool, glass wool, felt and mats consisting of the most varied materials, granulated cork, plastic foam, etc. Such deformable insulating materials, after the pipe-line to be insulated has been covered with them, require an outer lagging to protect the easily damaged insulation. Laggings made of various suitable materials are used for this purpose, such as for instance cellulose or paper laggings wound with textiles and impregnated. Finally, such a lagged insulation is also provided with several coats of paint.

This complicated arrangement of the hitherto customary insulations made of deformable insulating materials is absolutely necessary to increase durability, but it calls for a considerable expenditure of work which determines the production costs of such insulations as the costs of the materials themselves are relatively low.

The present invention aims at reducing the expenditure of work and relates to a method of covering pipe-lines with a soft and deformable insulating material. The method is characterized by the fact that a flat mat having the desired thickness is formed from the insulating material intended to cover the pipes and that one side of the said mat is applied to a cloth-type carrier. The insulating mat adhering to the carrier cloth is then laid round the pipe to be insulated, the carrier cloth forming the outside and its opposite longitudinal sides being joined together. To this end the carrier cloth, before being laid round the pipe to be insulated, is made into a suitable width and provided along both its longitudinal sides with interlocking closing edges.

The insulation according to the invention and which is used to apply the said method is characterized by a cloth-type carrier which forms the outside of the finish insulated pipe, to one side of which carrier a mat having the desired thickness and made of deformable insulating material adheres. This carrier cloth corresponds in width to the external diameter of the finish insulated pipe and is provided along its two longitudinal sides with interlocking closing edges.

A typical embodiment of the invention will now be described in detail in conjunction with Figs. 1 to 5 of the attached drawing in which:

Figs. 1 and 2 are a horizontal projection and a cross-section respectively of an insulation according to the invention before the said insulation is applied to a pipe;

Fig. 3 is an insulation according to Figs. 1 and 2 being used to cover a pipe to be insulated;

Fig. 4 is a cross-section, drawn on an enlarged scale, through the interlocking closing edges of the insulation according to Figs. 1 to 3;

Figs. 5a, 5b and 5c show parts of a tool for interlocking the closing edges according to Fig. 4.

As can be seen from Figs. 1 to 3, the insulation according to the invention consists of a cloth-type carrier 1, for instance a woven fabric, a plastic cloth, suitably impregnated and reinformed paper, on which the soft and deformable layer of insulating material 2 is located. It is possible to use as insulating material all those insulating substances which can be formed into a flat mat, the thickness of which corresponds approximately to the desired insulating thickness of the pipe-lines concerned. Thus all kinds of textiles, cellulose products, glass wool, plastic foam, etc. can be used for the purpose. The insulating mat 2 is applied to one side of the carrier cloth 1, for instance by pasting, by attachment with thread or clips, or in any other manner. The insulating mat adhering to the carrier 1 is, as can be seen from Fig. 3, laid round the pipe 3 to be insulated, the carrier cloth 1 forming the outside.

The width of the carrier cloth is chosen such that it corresponds to the external diameter of the finish insulated pipe and the two longitudinal sides are each provided with closing edges which can be secured to each other in a suitable manner.

In Figs. 1 to 3 a longitudinally profiled bar 4 and a hollow profiled support 5 are provided as closing edges and are illustrated in the interlock position on an enlarged scale in Fig. 4. The bar 4 therefore consists of a bar foot 6 which extends approximately at right angles to the web 7 which carries the bar head 8. On the side of the bar foot 6 facing the carrier cloth edge 1 a strip 9 is provided which extends along the entire closing edge and serves to join the profiled bar 6, 7, 8 to the carrier cloth edge 1, the joint being effected by welding or pasting. The closing edge 5 consists here of a hollow profiled member 10, the internal dimensions of which are approximately adapted to the bar head 8. The flat front wall of the hollow profiled member 10 is provided in the centre with a longitudinal slot 11, whereby two front wall longitudinal ribs are produced which are adapted in their cross-section to the longitudinal grooves between the bar head 8 and the bar foot 6 of the other closing edge. When the closing edges are interlocked, the two front wall longitudinal ribs prevent the bar head 8 from moving transversely to the longitudinal direction of the closing edges, i. e. they prevent the closing edges from coming apart. Here, the facing sides of the front wall longitudinal ribs and of the bar head undersides are pressed against each other. As shown by Fig. 4, these facing sides can also be bevelled in the manner of a barb.

The interlocking of the two profiled closing edges, which are advantageously made of a tough and resilient material, is effected with the aid of a tool according to Figs. 5a, 5b, 5c. The closing edge 5 is so introduced into the channel 13 in this tool that the web 14 forces the longitudinal slot 11 apart. The closing edge 4 is inserted in the channel 15, the strip 9 projecting from the longitudinal slot 16. If the tool is now moved relatively to the two closing edges 4 and 5 by means of a handle secured to the lug 17 in such a way that the said edges emerge from the opening 18 common to the two channels 14 and 15, the two closing edges 4 and 5 are then interlocked in a known manner.

The use of the described interlocking closing edges represents, it is true, a preferred embodiment and results in a tightly fitting connection of the longitudinal sides of the carrier cloth 1, but the invention is in no way restricted thereto. On the contrary, any other anchoring profiled member can be used, particularly such members as can be drawn or rolled. Furthermore, however, closing edges can be used which are connected to each other by flanging, pasting, welding, lacing, etc. If a suitable plastic is employed for the carrier cloth, the closing edges may also be made from the same material and be joined together in one of the ways mentioned. Finally, slide fasteners consisting of separate elements can also be used as closing edges.

When choosing the material for the cloth-type carrier 1, selecting the insulating mat 2 and designing the closing edges, attention must be paid to the course of the pipe-line, in particular to the number and radius of pipe bends in the line. The described insulation, however, can also be employed for any pipe bends, irrespective of their narrowness, provided the said insulation is correctly dimensioned.

Fig. 3 shows the carrier cloth 1 together with the insulating mat 2 applied directly to the pipe 3 to be insulated. This is not, of course, absolutely necessary and if desired, the pipe 3 can also be first provided with a layer of insulating stones or other insulating material whereupon the carrier cloth 1 together with the insulating mat 2 is then placed round this insulating layer. In this case the carrier 1 then serves at the same time as a reinforcement and wrapping for the inner insulating layer.

Having now particularly ascertained and described the nature of my said invention and in what manner the same is to be performed, I declare that what I claim is:

A thermal insulating covering for a pipe, said covering comprising a layer of pliable insulating material, a cloth-type carrier superposed upon and attached to said layer and having continuous longitudinal edge portions, said carrier being adapted to enclose said layer when surrounding said pipe and to completely seal said longitudinal edge portions throughout the length thereof, a profiled solid stringer secured to one longitudinal edge portion of said carrier, and a profiled hollow stringer secured to the other longitudinal edge portion of said carrier, each of said stringers consisting of resilient and tough material and having a longitudinally extending flat portion adjacent to and overlapping one of said longitudinal edge portions, said profiled solid stringer having longitudinal rib portions on both sides of said flat portion and perpendicular thereto, a web portion adjacent said rib portions and arranged in the plane of said flat portion and a head portion adjacent said web portion and opposite said rib portions, said profiled hollow stringer having a longitudinal tubular portion adjacent said flat portion and a slot formed therein over the length of said tubular member in the plane of said flat portion and having two front wall longitudinal ribs, said head portion being adapted to engage through said slot into said tubular portion to connect the ends of said cloth-type carrier along the longitudinal edge portions thereof, whereby when said head portion and said tubular portion are interlocked, said two front wall longitudinal ribs are prevented by said rib portions of said solid profiled stringer adjacent therewith from spreading, thereby preventing said head portion from moving transversely of the longitudinal direction of said tubular portion.

References Cited in the file of this patent
UNITED STATES PATENTS

| | | |
|---|---|---|
| 742,689 | Lord | Oct. 27, 1903 |
| 2,160,009 | Walker | May 30, 1939 |
| 2,354,485 | Slaughter | July 25, 1944 |
| 2,365,086 | Kamowski | Dec. 12, 1944 |
| 2,606,352 | Wende | Aug. 12, 1952 |

FOREIGN PATENTS

| | | |
|---|---|---|
| 146,865 | Switzerland | Sept. 7, 1954 |